United States Patent [19]

Fukushima et al.

[11] Patent Number: 4,680,662
[45] Date of Patent: Jul. 14, 1987

[54] DISK CARTRIDGE HAVING A SHUTTER MECHANISM

[75] Inventors: Yasuhisa Fukushima, Hirakata; Masuo Maruyama, Moriguchi; Benichi Miyazaki, Hirakata, all of Japan

[73] Assignee: Matsushita Electric Industrial Co., Ltd., Osaka, Japan

[21] Appl. No.: 737,495

[22] Filed: May 24, 1985

[30] Foreign Application Priority Data

Jun. 12, 1984 [JP] Japan .................................. 59-121142
Jul. 5, 1984 [JP] Japan ........................... 59-101814[U]
Jul. 11, 1984 [JP] Japan ........................... 59-104879[U]
Apr. 11, 1985 [JP] Japan .................................. 60-76937

[51] Int. Cl.⁴ .......................................... G11B 23/03
[52] U.S. Cl. .................................. 360/133; 206/144; 369/291
[58] Field of Search ............... 206/444; 369/289, 291; 360/133, 97, 99

[56] References Cited

U.S. PATENT DOCUMENTS 4,497,009 1/1985 Oishi et al. ........................... 360/133
4,503,474 3/1985 Nigam .................................. 360/133

FOREIGN PATENT DOCUMENTS 0137965 4/1985 European Pat. Off. ............ 360/133
57-52780 11/1982 Japan .
57-210486 12/1982 Japan ..................................... 360/99

Primary Examiner—John H. Wolff
Assistant Examiner—Matthew J. Bussan
Attorney, Agent, or Firm—Stevens, Davis, Miller & Mosher

[57] ABSTRACT

A cartridge includes a shutter movably mounted along and on outside surfaces of a cartridge box for opening or closing a central hole and a head slit together, a slider for driving the shutter, and guide grooves provided outside a receptacle for a disk and serving to guide the slider. The shutter normally closes the central hole and the head slit to permit the cartridge to completely surround the disk, thereby preventing entry of dust from the outside. Even when the slider is broken by accident, the disk is immune from scratches to be constantly held in a good state since the slider is moved on the outside of the receptacle. Moreover, a drive for the shutter is provided forwardly of the center of the receptacle to enable increasing the recording capacity of the disk and miniaturizing the cartridge.

7 Claims, 6 Drawing Figures

DISK CARTRIDGE HAVING A SHUTTER MECHANISM

BACKGROUND OF THE INVENTION

This invention relates to a cartridge which rotatably accomodates a disk such as a floppy disk and which is used with a recording and reproducing device for recording information on a circular disk, and reproducing or erasing the information.

A prior cartridge of this kind has a structure as is shown in FIG. 6.

A shutter 50 is provided within a receptacle 52 of a disk 51 in a manner to be rotatable concentrically about the center of rotation of the disk 51, and a head slit 54 is opened or closed by moving the shutter 50 by a slider 53.

With this structure, a guide groove 56 for the slider 53 for moving the shutter 50 is contiguous to the receptacle 52 where the disk 51 is rotatably housed, and is exposed to the outside, so that it is impossible to completely envelop the outer peripheral portion of the disk 51. This fact has caused various troubles as described in the following. The disk 51 sometimes collects dust which has entered through the small opening, or when the slider 53 is broken by accident during handling, pieces of the slider 53 or external members may enter through the opening and damage the disk 51, and further dust may enter the receptacle 52 through the broken portion of the slider 53, adhering to the disk 51. Furthermore, the shutter 50 is designed to move within the receptacle 52, so that not only does the shutter 50 shave off the inner wall of the receptacle 52 during movement but also the disk 51 collects the abrased powders produced due to repeated use of the shutter 50. Sometimes dust having covered the shutter 50 exposed to the outside through the head slit 54 is carried to the inside of the receptacle 52 by the shutter 50 itself, and consequently, the shutter 50 itself disadvantageously scatters the dust in the receptacle 52 and adheres to the disk 51. The shutter 50 consists of two parts which are attached to the upper half 57a and the lower half 57b of the cartridge box, respectively. Accordingly, the cartridge must be assembled while joining the two parts of the shutter 50 to the slider 53. So, the assembling of the cartridge box is difficult and there are limitations to the possible mimiaturization of a cartridge and increase in recording capacity, because provision of a space for accommodating the movement of the slider 53 tangentially of the outer periphery of the receptacle 52 along the side surface of the cartridge is indispensable for driving the shutter 50.

SUMMARY OF THE INVENTION

Accordingly, it is an object of the invention to provide a cartridge which can receive a disk in a good condition by preventing the disk from taking scratches or collecting dust when dust covers a shutter or a slider is broken by accident, not to mention its protection in the ordinary state.

It is another object of the invention to provide a cartridge which protects recording surfaces of a disk by preventing the recording area of the disk from taking scratches during storage or handling, and which is simple in construction for easy assembly and enables miniaturization or increase in recording capacity.

To this end, this invention provides a cartridge comprising; a cartridge box including a receptacle for rotatably accommodating a disk, a central hole adapted to receive a rotating means for the rotation of said disk and a head slit adapted to receive a head for recording, reproducing or erasing information on said disk; a channel-sectioned shutter movably mounted on the outer surfaces of said cartridge box for closing said central hole and said head slit; a slider for moving said shutter to open or close said central hole and said head slit; guide groove means for movably guiding said slider; and an elastic member for resiliently biasing said shutter in a direction in which said central hole and said head slit are normally closed; said receptacle having an inner wall which is concentrical with said central hole and is cylindrical-shaped to completely surround the entire outer periphery of said disk, thereby preventing said disk from being exposed to the outside except through said central hole and said head slit, and said shutter normally closing said central hole and said head slit to shut said disk in said receptacle.

The above and other objects, features and advantages of the present invention will become clear from the following description of the preferred embodiment thereof, taken in conjunction with the accompanying drawings.

DESCRIPTION OF THE PREFERRED EMBODIMENT

Hereinunder an embodiment of the invention will be explained with reference to FIGS. 1 to 5.

Figure 1:
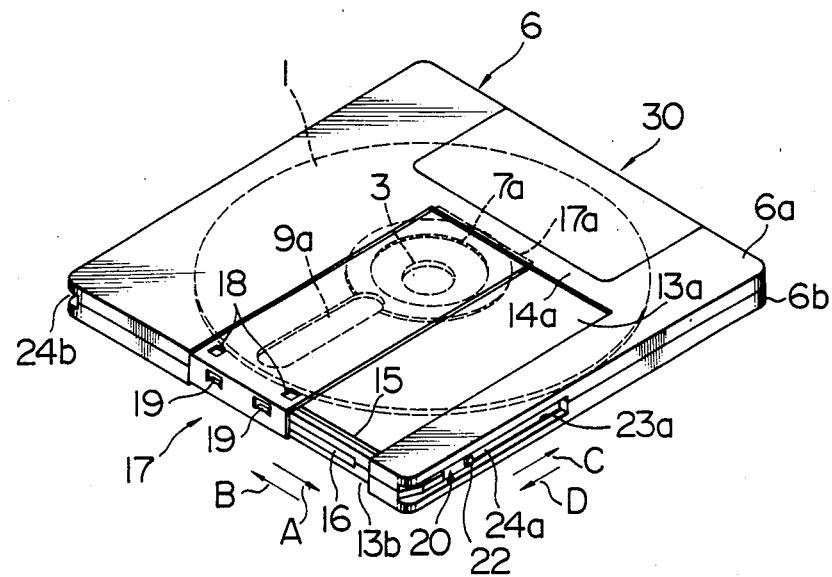
FIG. 1 is a perspective view of a cartridge according to an embodiment of the invention.
Figure 2:
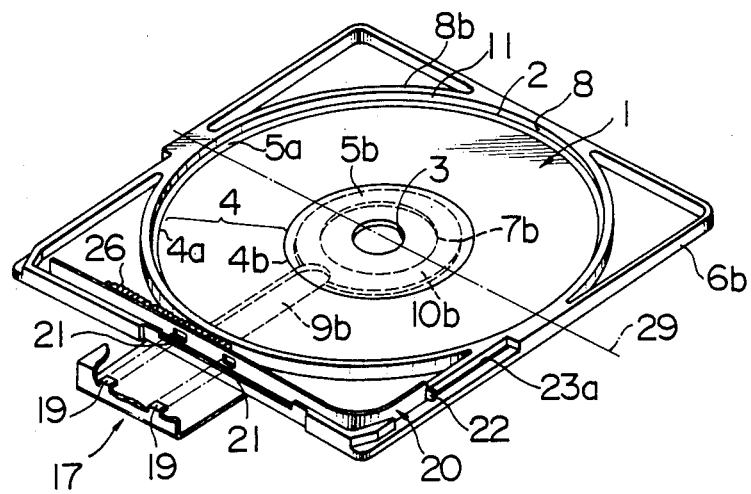
FIG. 2 is an exploded perspective view of the structure of the cartridge.

Referring first to FIGS. 1 and 2, reference numeral 1 denotes a disk for recording, reproducing or erasing information such as sound, picture information, or document information, and an engaging hole for engaging with a rotating means is formed in the central portion of the disk 1 for the purpose of rotating the disk. Reference numeral 4 represents a recording area, 5a an inner non-recording area and 5b an outer non-recording area. The numeral 2 denotes an outer peripheral portion of the disk 1.

A cartridge box 6 rotatably accommodates the disk 1, and is formed into a substantially parallelepiped consisting of an upper half 6a and a lower half 6b which are injection-molded products made of a material such as an ABS resin containing an antistatic agent, as is shown in FIG. 1.

The upper and lower halves 6a, 6b are provided with center holes 7a, 7b, cylindrical ribs 8a, 8b, head slits 9a, 9b and protrusions 10a, 10b, respectively. The center holes 7a, 7b correspond to an engaging hole 3 of the disk 1 and adapted to receive the rotating means. The cylindrical ribs 8a, 8b are concentric with the center holes 7a, 7b and adapted to receive the disk 1 rotatably and position the disk 1 in the radial direction. The head slits 9a, 9b are adapted to receive a head for recording, reproducing or erasing desired information. The protrusions 10a, 10b are disposed about the peripheral portions of the center holes 7a, 7b and are adapted to support the disk 1 at the inner non-recording area 5b thereof.

When the cartridge box 6 is composed by joining the upper half 6a and the lower half 6b together, the cylindrical rib 8a of the upper half 6a and the cylindrical rib 8b of the lower half 6b are abutted with each other to form a pair of peripheral surfaces. These peripheral surfaces define an inner wall 8 of a receptacle 11 to completely surround the entire outer peripheral portion of the disk 1.

Therefore, when a shutter, to be described later, covers the center holes 7a, 7b and the head slits 9a, 9b, the disk 1 is completely enclosed within the receptacle 11 to block passages for dust from the outside.

Figure 5:
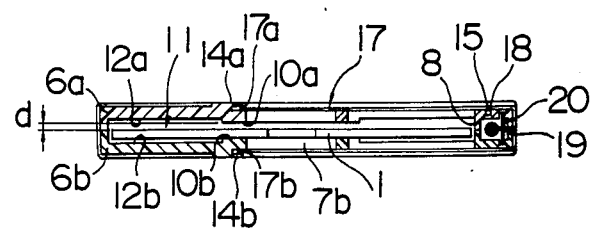
FIG. 5 is a longitudinal sectional view of the cartridge of FIG. 1.
Figure 6:
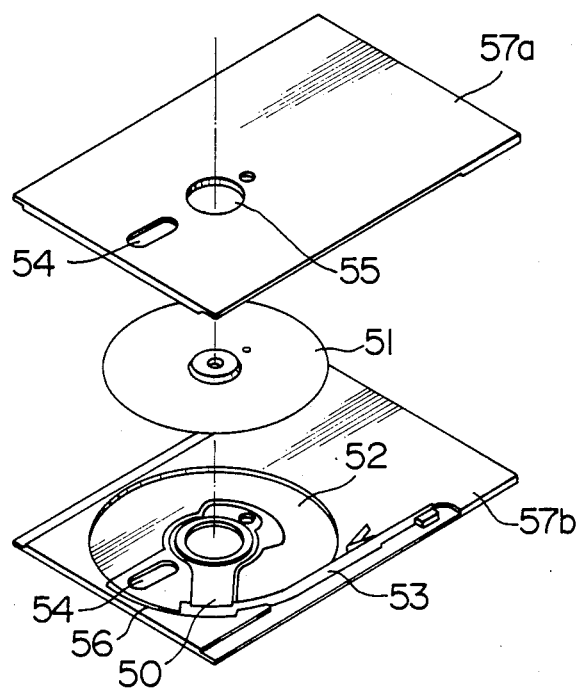
FIG. 6 is an exploded perspective view of a conventional cartridge.

The disk 1 is usually placed on the protrusion 10b of the lower half 6b and housed in the receptacle 11, as is shown in FIG. 5. The protrusion 10b is an extension of the peripheral portion of the center hole 7b and the outer periphery of the protrusion 10b is slightly smaller than a track 4b on the innermost periphery of the recording area 4 of the disk 1. The protrusion 10b is formed such that the recording area 4 of the disk 1 is out of contact with the outer periphery of the protrusion 10b when the disk 1 abuts against the inner wall 8 of the receptacle 11. This cartridge box 6 is constructed such that when the upper half 6a and the lower half 6b are joined together a gap between the protrusions 10a and 10b is greater than the thickness of the disk 1 by the amount of a slight spacing d. A spacing d of, for example, 0.5 to 1 mm is enough. Recesses 12a, 12b are formed to be contiguous to the outer peripheries of the protrusions 10a, 10b and are offset from the protrusions 10a, 10b so as not to interfere with recording area 4 of the disk 1 when the cartridge box 6 is clamped during handling as well as during storage. The inner non-recording area 5b of the disk 1, therefore, engages with either of the protrusions 10a, 10b to be rotatably supported thereby without any contact between the recording area 4 and the inner wall 8 of the cartridge 6, whereby the recording surface can be completely protected.

The reference numerals 13a, 13b denote depressions formed on the outer surfaces of the cartridge box 6, and the depression 13a is provided with a linearly extending guide groove 15 for guiding a shutter to be described later, as is shown in FIG. 1. The reference numeral 17 represents a channel-sectioned shutter for closing or opening the center holes 7a, 7b and the head slits 9a, 9b. The shutter 17 is provided with raised-up pieces 18 for engaging with the guide groove 15 and clicks 19 which are joined with a slider to be described later.

The raised-up pieces 18 are not only inserted into the guide groove 15, as is shown in FIGS. 1 and 5 so as to limit the translation of the shutter 17 in the directions indicated by the arrows A and B along the guide groove 15 but are also engaged with the guide groove 15 so as to prevent the shutter 17 from moving out of the depressions 13a, 13b. That is, the shutter 17 is translated the smallest possible distance to open or close the center holes 7a, 7b and the head slits 9a, 9b. Guard pieces 14a, 14b for covering free ends 17a, 17b, respectively, of the shutter 17 are provided integrally with the upper half 6a and the lower half 6b and are contiguous to the depressions 13a, 13d to be channel-sectioned.

The shutter 17 is moved with the free end 17a inserted between the depression 13a and the guard piece 14a and the free end 17b inserted between the depression 13b and the guard piece 14b. Even when an external force tending to force the free ends of the shutter apart were applied to the shutter 17, the free ends 17a, 17b of the shutter 17 would merely come into contact with the guard pieces 14a, 14b to prevent the shutter 17 from being disengaged from the cartridge box The reference numeral 20 denotes a slider for automatically moving the shutter 17 to positions where it closes or opens the center holes 7a, 7b and the head slits 9a, 9b, and in the central portion of the slider 20 are provided engaging holes 21 for receiving the clicks 19 so as to join the shutter 17 to the slider 20. A protrusion 22 for the driving of the slider 20 in the direction indicated by the arrow C is provided on one longitudinal end of the slider 20 and is adapted to engage with an external member. The slider 20 is formed of a leaf spring or a flexible resin such as polyacetal.

A pair of opposed guide grooves 23a, 23b for slidably guiding the slider 20 are designed to extend outside of the inner wall 8 of the receptacle 11 and contiguous to the cartridge box 6 along an opening groove 24a which is formed on the outer surface of the cartridge box 6. The respective ends of the guide grooves 23a, 23b and of the opening groove 24a terminate short of a virtual central line 29 of the receptacle 11. The driving means for driving the shutter 17 can be confined forwardly of the center of the receptacle 11, so that the outer diameters of the receptacle 11 and the disk 1 can be correspondingly enlarged to increase the recording capacity by the increment of the diameter of the disk 1. On the other hand, the width of the cartridge 30 can be correspondingly reduced to effect the miniaturization of the cartridge 30.

Figure 3:
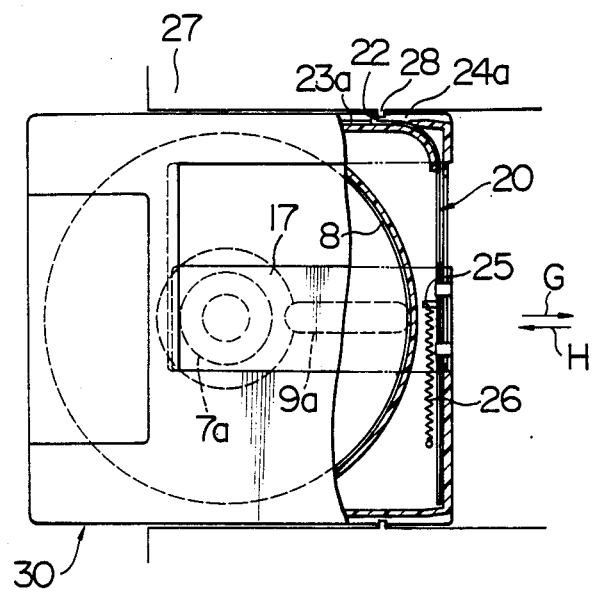
FIGS. 3 and 4 are plan views of the cartridge in the operational state.

As shown in FIG. 3, the slider 20 is received in the guide grooves 23a, 23b which have arcuate corners and the protrusion 22 of the slider 20 is exposed from the opening groove 24 of the cartridge box 6 to the outside. A protrusion 25 is provided at the central portion of the slider 20, and an elastic member 26 in the form of a tension spring or the like is anchored at the protrusion 25. The force of the elastic member 26 pulls the slider 20 in the direction indicated by the arrow B, and so the shutter 17 is pulled in the direction indicated by the arrow B. Thus, the shutter 17 is normally urged to such a position as to close the center holes 7a, 7b and the head slits 9a, 9b, thereby protecting the receptacle 11 against any penetration of dust.

A slot 16 is provided on the cartridge box 6 to expose the engaging holes 21 of the slider 20 to the outside and to permit insertion of the clicks 19 of the shutter 17, and is designed not to interfere with the clicks 19 when the shutter 17 moves in the direction indicated by the arrow A. The shutter 17 can be easily joined to the slider 20 after the assembly of the cartridge box 6 by mounting the shutter 17 to the cartridge box 6 so as to insert the clicks 19 of the slider 20 into the engaging holes 21 of the slider 20, as shown in FIG. 2.

An opening groove 24b is provided symmetrically to the opening groove 24a with respect to the center holes 7b, so that the cartridge 30 can be applied to a disk with its both faces usable, referred to as a "doublesided" disk. Needless to say, in case a cartridge is only used for use with single-sided disks, the opening groove 24b and the head slit 9a are unnecessary.

Figure 4:
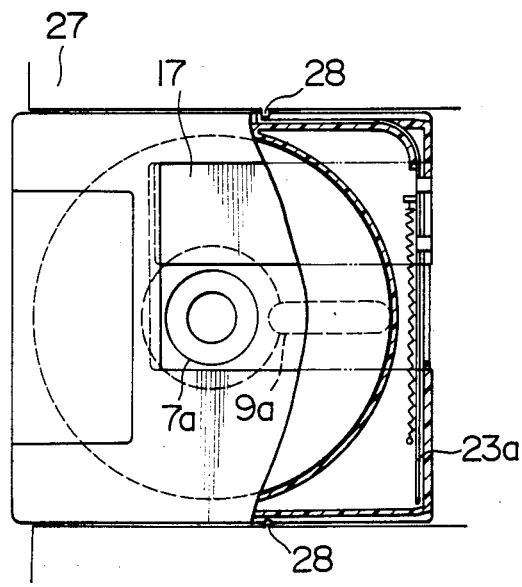

The moving operation of the shutter will next be described with reference to FIGS. 3 and 4.

The reference numeral 28 represents a protrusions provided on a main body of a recording and reproducing apparatus 27 so as to be inserted into the opening grooves 24a, 24b of the cartridge box 6. As the cartridge 30 is inserted into the apparatus body 27 in the direction indicated by an arrow G, as shown in FIG. 3, the protrusion 28 enters into the opening groove 24a to abut against the protrusion 22 formed on one end of the slider 20. This protrusion 28 limits further advancement of the protrusion 22 into the interior of the apparatus body 27. As the cartridge 30 is inserted further, advance of the protrusion 22 is checked to cause the slider 20 to move along the guide grooves 23a, 23b in the direction indicated by the arrow H to the extent corresponding to the amount by which the cartridge 30 is inserted. Correspondingly, the shutter 17 combined with the slider 20 is moved in the direction indicated by the arrow A. Therefore, as the cartridge 30 is inserted into the apparatus body 27, the shutter 17 is automatically moved in the direction indicated by the arrow A to finally completely open the center holes 7a, 7b and the head slits 9a, 9b, thus making the cartridge 30 ready to receive the rotating means and the heads.

When removing the cartridge 30 mounted on the apparatus body 27, the above operation is reversed. Thus, the shutter 17 is automatically moved in the direction of the arrow B by the biasing force of the elastic member 26 to close again the center holes 7a, 7b and the head slits 9a, 9b, as shown in FIG. 3, thereby preventing penetration and adhesion of dust.

As described above, according to this invention, a shutter for closing center holes and a head slit simultaneously is provided to be movable on the outer surface of a cartridge box, and a slider and an elastic member for driving the shutter are provided on the outside of a receptacle for rotatably accommodating a disk, such that the disk is not exposed to the outside except through the center holes and the head slit. Accordingly, penetration of dust from the outside can be reduced to the minimum, and a disk is released from flaws or adhesion of dust to be kept in a good condition when dust lies on the shutter or when the slider is broken by accident. Since the shutter moves outside the receptacle, there is little influence of abrased powder resulted from movement of the shutter. Furthermore, the cartridge of the invention becomes not only simple in construction as compared with what is called a "shutter built-in type" cartridge but is also very easy in assembly because the shutter can be joined to the slider merely by inserting the shutter from outside.

In addition, in the cartridge of the invention, the shutter is moved linearly and transversely to the inserting direction of the cartridge, and the driving means for the shutter are entirely confined forward of the center of the receptacle. This arrangement brings about the following advantages.

The diameters of the receptacle and the disk can be enlarged by the space in which the slider moves, so that the recording capacity can be increased by the increment of the diameter of the disk. Conversely, it is also possible to make the width of the cartridge smaller by that amount, thereby effecting the miniaturization of a cartridge.

As described above, according to the invention, a cartridge is provided which can always maintain a disk in a good state to prolong the life thereof. In addition, this invention can increase the recording capacity of a cartridge or miniaturize a cartridge.

While there has been described what is at present considered to be a preferred embodiment of the invention, it will be understood that various modifications may be made therein, and it is intended that the appended claims cover all such modifications as fall within the true spirit and scope of the invention.

What is claimed is:

1. A cartridge comprising:
    a cartridge box including a receptacle for rotatably accommodating a disk, a central hole adapted to receive a rotating means for the rotation of said disk and a head slit adapted to receive a head for recording, reproducing or erasing information on said disk;
    a shutter which is movable along guide grooves formed on the outer surfaces of said cartridge box for opening and closing said central hole and said head slit;
    a slider for moving said shutter to open or close said central hole and said head slit;
    guide groove means for movably guiding said slider; and
    an elastic member for resiliently biasing said shutter in a direction of normally closing said central hole and said head slit;
    said receptacle having an inner wall which is concentrical with said central hole and is cylindrical-shaped to completely surround the entire periphery of said disk, thereby preventing said disk from being exposed to the outside except through said central hole and said head slit, and said shutter normally closing said central hole and said head slit to shut said disk in said receptacle.

2. A cartridge as set forth in claim 1, wherein said guide groove means is outside an inner wall of said receptacle and is contiguous to an interior of said cartridge box and extends along an opening groove which is provided on outside surfaces of said cartridge box.

3. A cartridge as set forth in claim 1, further comprising a pair of protrusions provided on inner surfaces of said receptacle, which face the surfaces of said disk, said protrusions being adapted to support a central non-recording area of said disk.

4. A cartridge as set forth in claim 1, further comprising protrusions provided on inner surfaces of said shutter which oppose said slider and which engage with engaging holes formed on said slider, to join said shutter to said slider.

5. A cartridge as set forth in claim 1 or 4, wherein said shutter is adapted to linearly move in a direction transverse to the direction in which said cartridge is inserted into a recording and reproducing apparatus.

6. A cartridge as set forth in claim 1, further comprising guard pieces mounted on said cartridge box to oppose sliding surfaces of said shutter and to cover ends of said shutter.

7. A cartridge as set forth in claim 2, wherein said guide groove means and opening groove are confined to an area which is disposed either forward or rearward of a virtual center line of said receptacle.

* * * * *